(12) United States Patent  (10) Patent No.: US 7,748,874 B2
Cho  (45) Date of Patent: Jul. 6, 2010

(54) LIGHT PIPE AND ILLUMINATING DEVICE HAVING THE SAME

(75) Inventor: Han Kyu Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/268,160

(22) Filed: Nov. 10, 2008

(65) Prior Publication Data

US 2009/0284982 A1  Nov. 19, 2009

(30) Foreign Application Priority Data

May 15, 2008 (KR) .................. 10-2008-0045116
Aug. 13, 2008 (KR) .................. 10-2008-0079591

(51) Int. Cl.
*F21V 33/00* (2006.01)

(52) U.S. Cl. ................. 362/340; 362/582; 362/551; 362/339

(58) Field of Classification Search ........... 362/340, 362/339, 582
See application file for complete search history.

(56) References Cited

U.S. PATENT DOCUMENTS

| 4,750,798 | A | * | 6/1988 | Whitehead ............ 385/133 |
| 4,996,632 | A | | 2/1991 | Aikens |
| 5,258,896 | A | | 11/1993 | Dreyer, Jr. |
| 5,700,077 | A | * | 12/1997 | Dreyer et al. ........... 362/551 |
| 5,745,632 | A | | 4/1998 | Dreyer |
| 6,612,729 | B1 | * | 9/2003 | Hoffman ............... 362/551 |
| 6,796,686 | B2 | * | 9/2004 | Jacob et al. ............ 362/293 |
| 2002/0141065 | A1 | | 10/2002 | Cowan et al. |
| 2004/0218390 | A1 | | 11/2004 | Holman et al. |
| 2007/0018185 | A1 | | 1/2007 | Hung |
| 2009/0147179 | A1 | | 6/2009 | Yamashita et al. |

FOREIGN PATENT DOCUMENTS

| DE | 29805667 U1 | 7/1998 |
| EP | 0225123 A2 | 6/1987 |
| EP | 1591826 A1 | 11/2005 |
| GB | 2145760 A | 4/1985 |
| KR | 10-2002-0091255 A | 12/2002 |
| KR | 10-2008-0014387 A | 2/2008 |
| WO | WO-95/30218 A1 | 11/1995 |
| WO | WO 01/71396 A1 | 9/2001 |
| WO | WO-2007/046337 A1 | 4/2007 |
| WO | WO-2007/064615 A1 | 6/2007 |

* cited by examiner

*Primary Examiner*—Laura Tso
(74) *Attorney, Agent, or Firm*—Birch, Stewart, Kolasch & Birch, LLP

(57) ABSTRACT

A light pipe and an illuminating device having the light pipe are provided. The light pipe includes an optical film including a plurality of prisms and being rolled to have a cavity extending along a longitudinal direction of the prisms; and a supporter surrounding the optical film having the cavity, wherein a side surface of one of the prisms has the maximum surface roughness of about 600 nm to about 1.5 □. Accordingly, it is possible to emit a light toward a distant area through the diffraction of light and thus to provide uniform luminance.

18 Claims, 12 Drawing Sheets

LIGHT PIPE AND ILLUMINATING DEVICE HAVING THE SAME

CROSS-REFERENCE TO RELATED APPLICATION

This application claims priority from Korean Patent Applications No. 10-2008-0045116 filed on May 15, 2008 and No. 10-2008-0079591 filed on Aug. 13, 2008 in the Korean Intellectual Property Office, the disclosure of which is incorporated herein by reference in its entirety.

BACKGROUND OF THE INVENTION

1. Field of the Invention

The present invention relates to a light pipe and an illuminating device having the light pipe, and more particularly, to a light pipe including an optical film having a plurality of prisms whose surface roughness falls within a predetermined range, and an illuminating device having the light pipe.

2. Description of the Related Art

Illuminating devices using a light pipe capable of transmitting light to a distant place with less transmission loss can be used in various places, for example, inside and outside a building. Light pipes, which are also referred to as light conduits, light guides or light tubes, have been used to effectively distribute light across a wide area for various purposes such as for illumination.

Light pipes can be used not only for illuminating certain points but also for illuminating whole areas. Light that transmits through a light pipe may be distributed to the outside of the light pipe for illuminating certain points or for maximizing the effect of illumination.

However, conventionally, it is difficult to appropriately control the transmission of light in a light pipe and the emission of light from a light pipe. Thus, it is difficult to achieve uniform brightness across a longitudinal direction of a light pipe.

Therefore, it is necessary to develop a light pipe which is easy to fabricate and is capable of transmitting and emitting light toward a distant place.

SUMMARY OF THE INVENTION

Aspects of the present invention provide a light pipe capable of emitting light while achieving uniform brightness across a longitudinal direction of the light pipe and an illuminating device having the light pipe.

However, the aspects, features and advantages of the present invention are not restricted to the ones set forth herein. The above and other aspects, features and advantages of the present invention will become more apparent to one of ordinary skill in the art to which the present invention pertains by referencing a detailed description of the present invention given below.

According to an aspect of the present invention, there is provided a light pipe including an optical film including a plurality of prisms and being rolled to have a cavity extending along a longitudinal direction of the prisms; and a supporter surrounding the optical film having the cavity, wherein a side surface of one of the prisms has a maximum surface roughness of about 600 nm to about 1.5 $\square$.

According to another aspect of the present invention, there is provided an illuminating device including a light source; and a light pipe transmitting and distributing the light emitted from the light source, wherein the light pipe includes an optical film including a plurality of prisms and being rolled to have a cavity extending along a longitudinal direction of the prisms; and a supporter surrounding the optical film having the cavity, wherein a side surface of one of the prisms has a maximum surface roughness of about 600 nm to about 1.5 $\square$.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE EXEMPLARY EMBODIMENTS

The present invention will now be described more fully with reference to the accompanying drawings, in which exemplary embodiments of the invention are shown.

Figure 1:
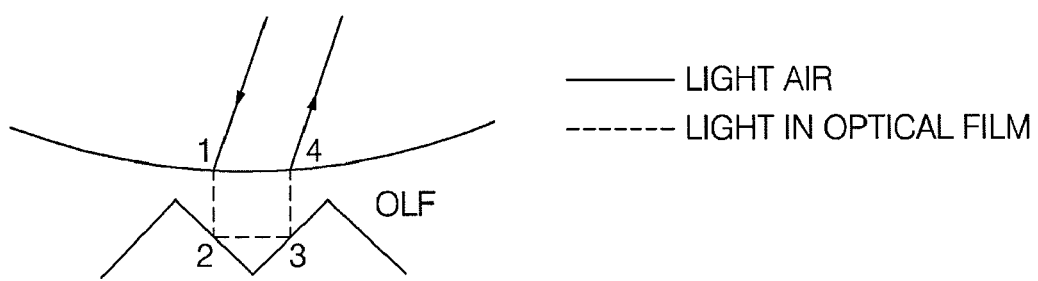
FIG. 1 illustrates a cross-sectional view of an optical film of a light pipe and explains the transmission and the reflection of light in the light pipe.
Figure 2:
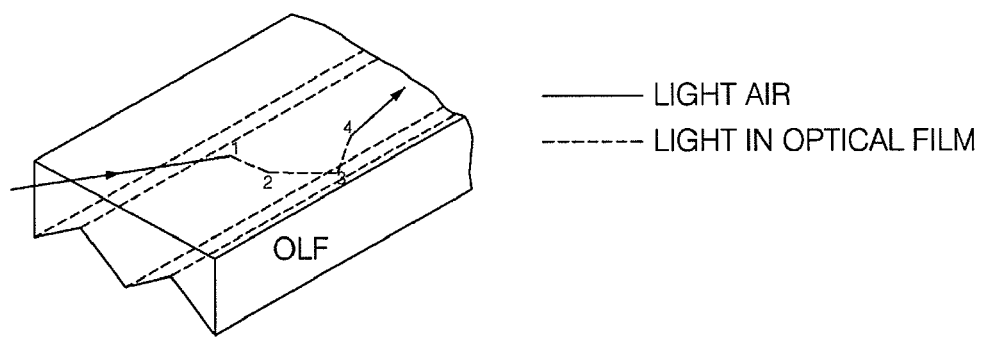
FIG. 2 illustrates a perspective view of the optical film shown in FIG. 1.

FIGS. 1 and 2 illustrate diagrams for explaining the transmission and the reflection of light in the light pipe.

FIG. 1 illustrates a cross-sectional view of an optical film of a light pipe and explains the transmission and the reflection of light in the light pipe, and FIG. 2 illustrates a perspective view of the optical film shown in FIG. 1. For convenience, assume that a patterned surface of an optical film is the top surface of the optical film, and that a non-patterned surface of the optical film is the bottom surface of the optical film.

Referring to FIGS. 1 and 2, light generated by a light source unit (not shown) is incident upon a non-patterned surface of an optical film of a light pipe and is then refracted at position 1 on the optical film. Thereafter, the refracted light is totally reflected at positions 2 and 3 on both side surfaces of a prism of the optical film. Thereafter, the totally-reflected light is refracted at position 4 on the optical film and is thus incident back into the light pipe.

In this manner, light may travel along the longitudinal direction of the light pipe. Since light loss rarely occurs in the air inside the light pipe, the light pipe can effectively transmit light even to a distant area without any light loss.

Figure 3:
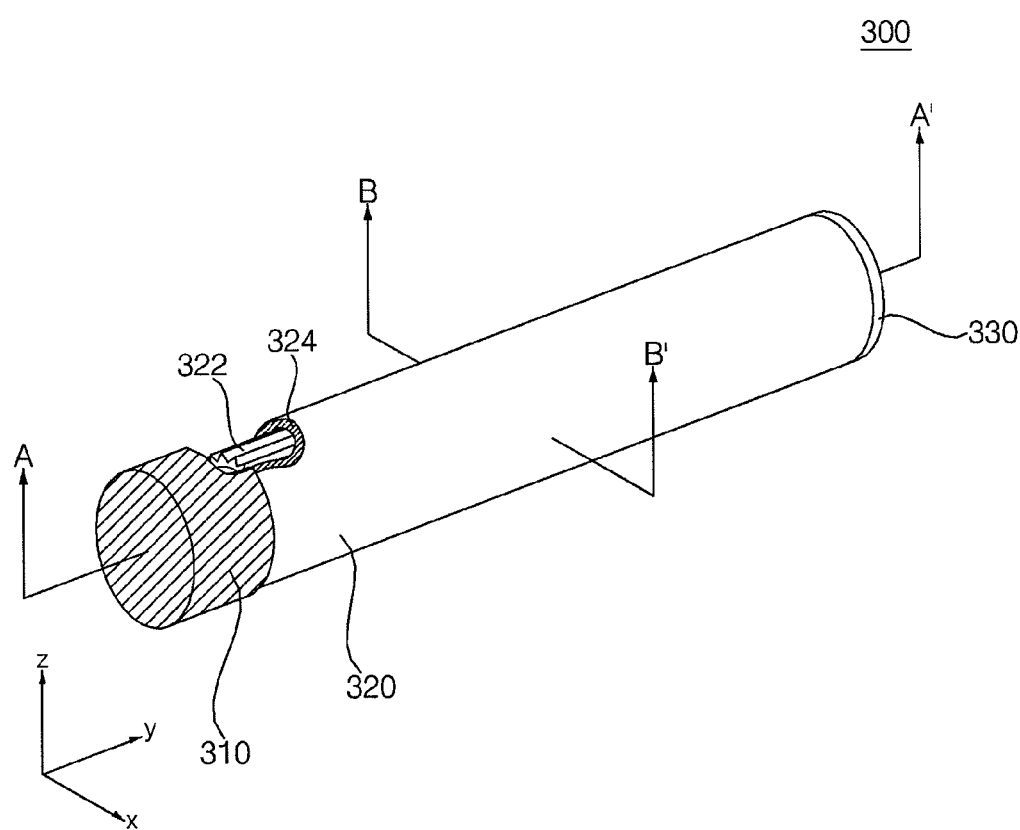
FIG. 3 illustrates a partially-exploded perspective view of an illuminating device according to an exemplary embodiment of the present invention.

FIG. 3 illustrates a partially-exploded perspective view of an illuminating device 300. Referring to FIG. 3, the illuminating device 300 may include a light source unit 310 and a light pipe 320. The illuminating device 300 may also include a reflective cap 330.

The light source unit 310 generates light and provides the generated light to the light pipe 320. The light source unit 310 may include at least one light source 312 which generates light. Light generated by the light source unit 310 may be provided to the light pipe 320 and may thus be emitted to the outside of the illuminating device 300 through the light pipe 320.

The light pipe 320 may be provided with light generated by the light source unit 310 and may emit light by transmitting and distributing the light generated by the light source unit 310. The light pipe 320 may include an optical film 322, which evenly distributes light by reflecting or refracting the light generated by the light source unit 310, and a supporter 324.

The optical film 322 may have a patterned surface, on which a plurality of prisms. The optical film 322 may be rolled to have a cavity 380 extending along a longitudinal direction of the prisms, e.g., a Y direction. The optical film 322 may transmit light to a distant place from the light source unit 310 by reflecting or refracting light generated by the light source unit 310.

If a plurality of prisms are formed on the patterned surface of the optical film 322, the maximum surface roughness of the prisms, and particularly, a peak-to-valley (PV) surface roughness of the prisms, may be 600 nm to 1.5 □. If the PV surface roughness of the prisms is less than 600 nm, the scattered reflection of the optical film 322 may deteriorate, and thus, the optical film 322 may not be able to uniformly emit light. On the other hand, if the PV surface roughness of the prisms is more than 1.5 □, the optical transmittance of the optical film 322 may deteriorate.

The surface roughness of the prisms of the optical film 322 will be described later in further detail with reference to FIGS. 5 and 6.

The reflective cap 330 is attached onto one end of the light pipe 320 and reflects light transmitted or distributed by the light pipe 320. The light source unit 310 and the reflective cap 330 may be disposed on opposite sides of the light pipe 320. The reflective cap 330 may include a reflective mirror 332, which is coupled to the light pipe 320 and reflects light transmitted by the light pipe 320. The reflective cap 330 may confine light emitted from the light source unit 310 in the light pipe 320, thereby improving the brightness of the illuminating device 300.

Figure 4:
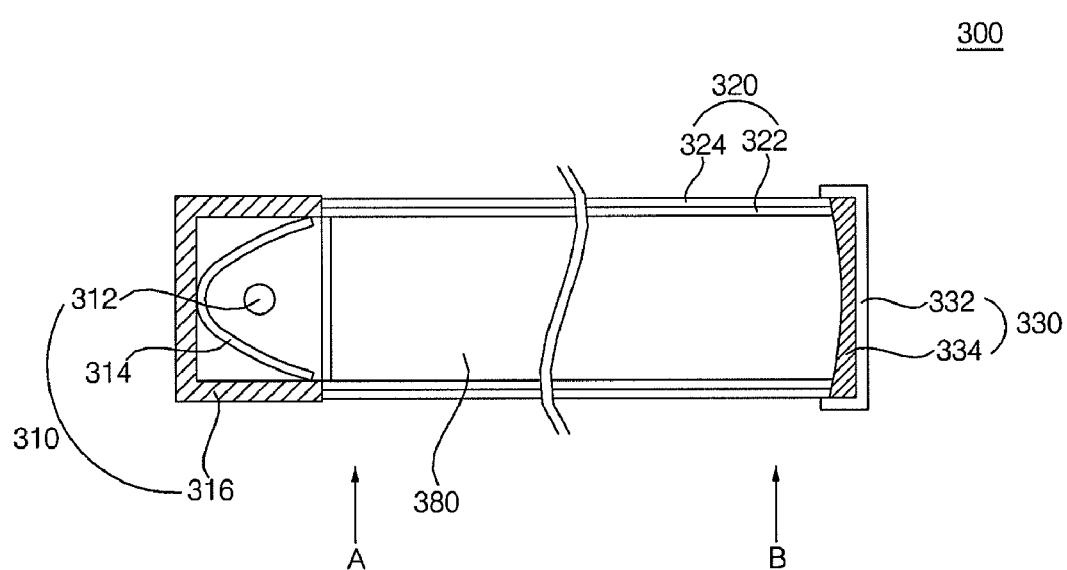
FIG. 4 illustrates a cross-sectional view of the illuminating device shown in FIG. 3, taken along line A-A' of FIG. 3.

FIG. 4 illustrates a cross-sectional view of the illuminating device 300 shown in FIG. 3, taken along line A-A' of FIG. 3. Referring to FIG. 4, the illuminating device 300 may include the light source unit 310 and the light pipe 320. The light source unit may include a housing 316, the light source 312, and a reflective mirror 314. The reflective cap 330 may include a cap portion 332 and a reflector 334.

More specifically, the light source unit 310 may include the light source 312, which emits light, the reflective mirror 314, which reflects the light emitted by the light source 312 and thus guides the corresponding light into the light pipe 320, and the housing 316, which holds the light source 312 and the reflective mirror 314.

The light source 312 may be a lamp generating light. Various types of lamps may be used as the light source 312 according to the type of environment in which the light pipe 320 is arranged. For example, a halogen lamp, a light-emitting diode (LED), a metal halide lamp or a plasma lighting source may be used as the light source 312.

The reflective mirror 314 is disposed at the rear of the light source 312. The reflective mirror 314 may be coated with a highly-reflective metal material such as aluminum or silver. The structure of the reflective mirror 314 may be altered according to the length of the illuminating device 300. The reflective mirror 314 may be implemented as an aspherical mirror. A surface of the reflective mirror 314 facing the light source 312 may be coated with a film containing a metal material such as aluminum or silver, thereby improving the reflectiveness of the reflective mirror 314.

The housing 316 has an empty space and may thus hold the light source 312 and the reflective mirror 314 therein. The housing 316 may protect the light source 312 and the reflective mirror 314 against external shock or foreign materials. In order to protect the light source 312 and the reflective mirror 314, the housing 316 may be formed of a material that is highly rigid and heat-resistant and can be processed easily.

The light pipe 320 may be optically connected to the light source unit 310. The light pipe 320 may transmit and distribute the light generated by the light source unit 310. The light pipe 320 may include the optical film 322 having a patterned surface that reflects or refracts light and the supporter 324 surrounding the optical film 322. The optical film 322 may be rolled to have the cavity 380. A surface of the optical film 322 facing the supporter 324 may be patterned. The optical film 322 transmits and distributes light emitted by the light source unit 310 and may thus enable the light pipe 320 to uniformly emit light.

The reflective cap 330 may include the cap portion 332, which is attached to one end of the light pipe 320, and the reflector 334, which is disposed in the cap portion 332 and reflects light emitted from the light pipe 320. The reflector 334 may be coated with a coating layer containing a highly-reflective metal material such as aluminum or silver and may thus be able to effectively reflect light emitted from the light pipe 320. The reflector 334 may be flat or spherical. If the reflector 334 is spherical, the reflector 334 may be implemented as a concave mirror having a curvature of 0.001 or less.

Figure 5:
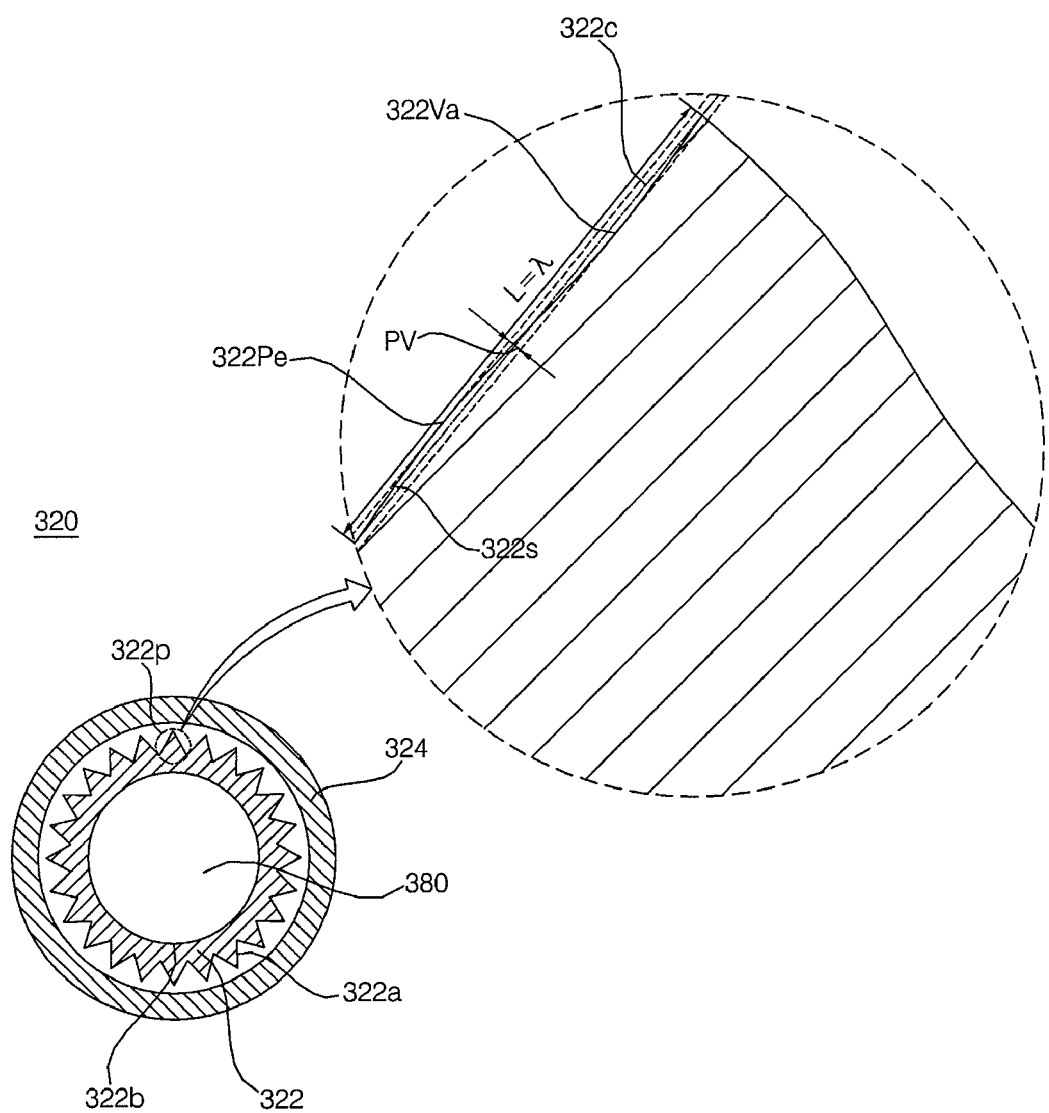
FIG. 5 illustrates a cross-sectional view of a light pipe shown in FIG. 3, taken along line B-B' of FIG. 3.

FIG. 5 illustrates a cross-sectional view of the light pipe 320 shown in FIG. 3, taken along line B-B' of FIG. 3. Referring to FIG. 5, the light pipe 320 may include the optical film 322 having a prism structure and the supporter 324 surrounding the optical film 322.

The optical film 322 may include a first surface 322a, which is a patterned surface on which a plurality of prisms 322p are formed, and a second surface 322b, which is opposite to the first surface 322a. The prisms 322p may extend along a longitudinal direction of the light pipe 320. The prisms 322p may be formed as isosceles triangles, regular triangles or trapezoids. The prisms 322p may be arranged on an outer surface of the optical film 322 so that the apexes of the prisms 322p can face the supporter 324. The optical film 322 may be rolled to have a cavity 380, but the present invention is not restricted to this. That is, the optical film 322 may be formed in various shapes, other than that set forth herein.

The supporter 324 may be formed using a coating method, an extrusion method, an injection method or a roll processing method. For example, the supporter 324 may be formed by forming a film of resin through coating, extrusion, injection or roll processing and rolling up the film into a cylinder. Alternatively, the supporter 324 may be formed by forming a cylinder of resin through extrusion. The supporter 324 may be formed using various methods, other than those set forth herein.

The supporter 324 may be disposed on the outside of the optical film 322. The supporter 324 supports the optical film 322 and protects the optical film 322 against dust or external shock.

The optical film 322 may be formed of a thermoplastic resin material with high optical transmittance and excellent impact-resistant and heat-resistant properties. For example, the optical film 322 may be formed of polyethylene terephthalate (PET), polycarbonate (PC) or polymethyl metacrylate (PMMA). In particular, since polycarbonate is highly rigid, is not easily broken and deformed, and provides high visible light transmittance, polycarbonate is suitable for use in the fabrication of the optical film 322.

The supporter 324 may be formed of a copolymer of at least one of polycarbonate, PMMA, acryl, polypropylene, polystyrene, and polyvinyl chloride.

The more regular the prisms 322p are, the more the scattered reflection of the optical film 322 deteriorates and thus, the more difficult it becomes for the light pipe 320 to uniformly emit light. On the other hand, the more irregular the prisms 322p are, the more the optical transmittance of the optical film 322 deteriorates.

Surface roughness is a measure of surface irregularities. In one embodiment, the surface roughness of side surfaces 322s each of the prisms 322p may indicate the surface roughness of the side surfaces 322s of each of the prisms 322p, and the maximum surface roughness (PV) of the side surfaces 322s of each of the prisms 322p may indicate a peak-to-valley height of the side surfaces 322s of each of the prisms 322p. In other embodiments, different measures may be used to determine surface roughness.

Table 1 shows the relationship between the surface roughness of the side surfaces 322s each of the prisms 322p and the luminance and the optical transmittance of the light pipe 320.

TABLE 1

| Maximum Surface Roughness (PV) | Surface Luminance of A portion (cd/□) | Surface Luminance of B portion (cd/□) | Optical Transmittance |
|---|---|---|---|
| 500 nm | 6000 | 5000 | □ |
| 600 nm | 5950 | 5430 | ○ |
| 700 nm | 5900 | 5450 | ○ |
| 800 nm | 5860 | 5460 | ○ |
| 900 nm | 5830 | 5490 | ○ |
| 1□ | 5790 | 5500 | ○ |
| 1.1□ | 5760 | 5500 | ○ |
| 1.2□ | 5740 | 5510 | ○ |
| 1.3□ | 5720 | 5510 | ○ |
| 1.4□ | 5710 | 5515 | ○ |
| 1.5□ | 5700 | 5520 | ○ |
| 1.6□ | 5690 | 5520 | x |

Here, the symbol □ indicates excellent performance due to improved optical transmittance, the symbol ○ indicates good performance, and the symbol × indicates poor performance due to deteriorated optical transmittance. Referring to Table 1, if each of the prisms 322p has a maximum surface roughness (PV) of less than 600 nm, the scattered reflection of the light pipe 320 may considerably deteriorate, and thus, the difference between the surface luminance at an end of the light pipe 320 near the light source unit 310 (i.e., the surface luminance at portion A) and the surface luminance at the other end of the light pipe 320 distant from the light source unit 310 (i.e., the surface luminance at portion B) may increase. Therefore, it may become more difficult to uniformly emit light across the whole light pipe 320.

On the other hand, if each of the prisms 322p has a maximum surface roughness (PV) of more than 1.5 □, not only the optical transmittance of the optical film 322 but also the optical transmittance of the whole light pipe 320 may deteriorate.

Therefore, the maximum surface roughness (PV) of the prisms 322p may be within the range of 600 nm to 1.5 □. In this case, the light pipe 320 may be able to effectively transmit light from one end to the other end of thereof, and the optical transmittance of the light pipe 320 may increase.

The surface roughness of the prisms 322p may be determined based on the root mean square (RMS) surface roughness measurements obtained from the side surfaces 322s of each of the prisms 322p. The RMS surface roughness of the side surfaces 322s of each of the prisms 322p may be calculated using Equation (1):

$$RMS = \sqrt{\frac{1}{L}\int_0^L z^2(x)\,dx}$$

where RMS indicates the RMS surface roughness of the side surfaces 322s of each of the prisms 322p, L indicates the length of the side surfaces 322 of each of the prisms 322p, and z indicates the distance between an imaginary line 322c and an arbitrary point x on each of the side surfaces 322s of each of the prisms 322p.

Table 2 shows the relationship between the RMS surface roughness of the side surfaces 322s of the prisms 322p and the luminance and the optical transmittance of the optical film 322.

TABLE 2

| RMS Surface Roughness | Surface Luminance of portion A (cd/□) | Surface Luminance of portion B (cd/□) | Optical Transmittance |
|---|---|---|---|
| 30 nm | 5950 | 5120 | □ |
| 32 nm | 5900 | 5180 | □ |
| 33 nm | 5880 | 5460 | ○ |
| 35 nm | 5870 | 5460 | ○ |
| 40 nm | 5865 | 5465 | ○ |
| 50 nm | 5860 | 5468 | ○ |
| 70 nm | 5750 | 5470 | ○ |
| 100 nm | 5720 | 5475 | ○ |
| 120 nm | 5715 | 5478 | ○ |
| 150 nm | 5700 | 5490 | ○ |
| 170 nm | 5690 | 5500 | ○ |
| 200 nm | 5670 | 5510 | ○ |
| 210 nm | 5660 | 5515 | x |

Here, the symbol □ indicates excellent performance due to improved optical transmittance, the symbol ○ indicates good performance, and the symbol × indicates poor performance due to deteriorated optical transmittance. Referring to Table 2, if the RMS surface roughness of the prisms 322p is less than 33 nm, the scattered reflection of the optical film 322 may considerably deteriorate, and thus, the difference between the surface luminance at portion A (i.e., an end of the light pipe 320 near the light source unit 310) of the light pipe 320 and the surface luminance at portion B (i.e., the other end of the light pipe 320 distant from the light source unit 310) of the light pipe 320 may considerably increase. Therefore, it may become more difficult to uniformly emit light across the whole light pipe 320.

On the other hand, if the RMS surface roughness of the prisms 322p is more than 200 nm, not only the optical transmittance of the optical film 322 but also the optical transmittance of the whole light pipe 320 may deteriorate.

Therefore, the prisms 322p may have an RMS surface roughness of 33 nm to 200 nm. In this case, the light pipe 320 may be able to effectively transmit light from one end to the other end of thereof, and the optical transmittance of the light pipe 320 may increase.

FIG. 5 also shows that the surface roughness can approximate a sinusoidal shape. Controlling the sinusoidal shape during manufacturing can result in light pipe performance improvements. In one embodiment, the wavelength $\lambda$ of the sinusoid is approximately equal to the length L of the side surfaces 322 of each of the prisms 322p. In other embodiments, the length L is about 0.5$\lambda$ to about 2.0$\lambda$. Other length L/wavelength $\lambda$ ratios are possible. Regardless of the length L/wavelength $\lambda$ ratio, maximum surface roughness is controlled to be within a band that avoids a) poor performance due to deteriorated scattered reflection; and b) poor performance due to deteriorated optical transmittance. The wavelength $\lambda$ is the length of the sinusoidal shape. Even though the wavelength $\lambda$ is illustrated in FIG. 5 as being the same as the length L, the wavelength $\lambda$ may not necessarily be the same as the length L.

Also, in one embodiment, the centerline of the sinusoid intersects the apex of the corresponding prism 322p. In other words, in this embodiment, the sinusoid is controlled so that neither a peak (322pe) nor a valley (322va) occurs at the apex.

Figure 6:
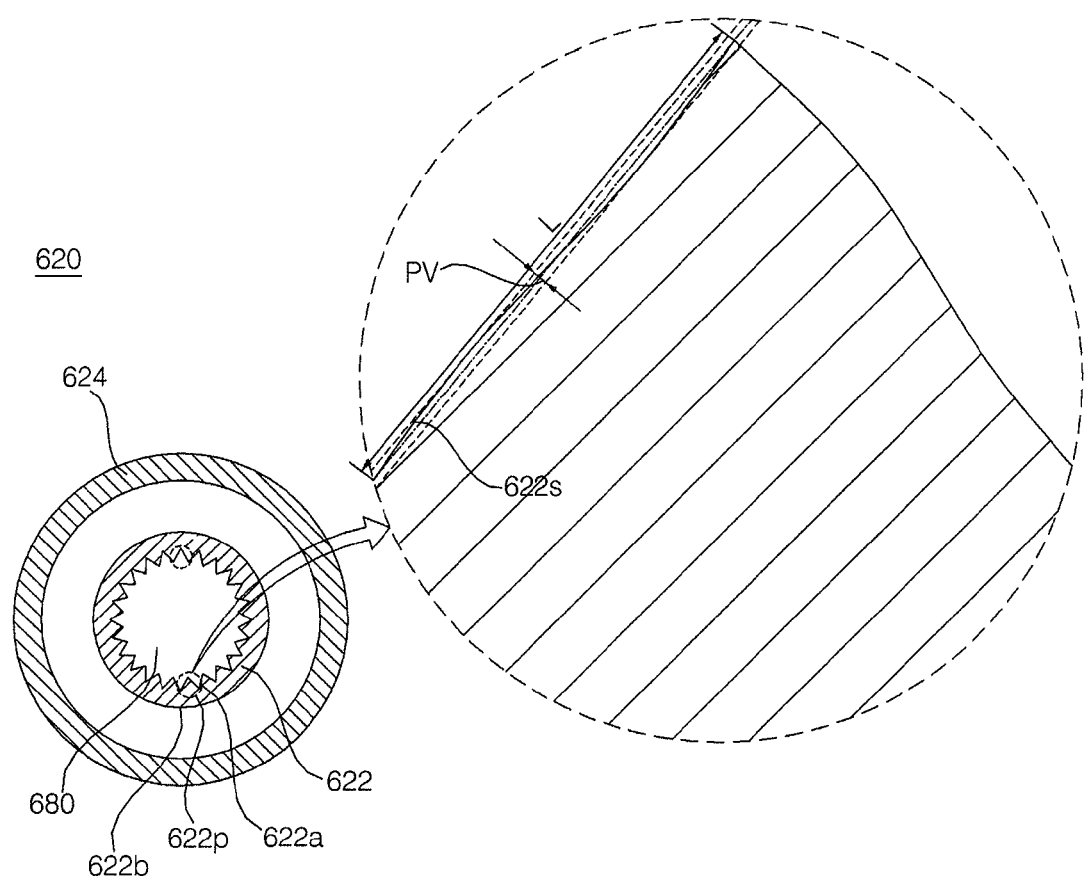
FIG. 6 illustrates a cross-sectional view of a variation of the light pipe shown in FIG. 3, taken along line B-B' of FIG. 3.

FIG. 6 illustrates a cross-sectional view of a variation of the light pipe 320 shown in FIG. 3, i.e., a light pipe 620, taken along line B-B' of FIG. 3. Referring to FIG. 6, the light pipe 620, like the light pipe 320 shown in FIG. 5, may include a supporter 624 and an optical film 622 having a first surface 622a, which is a patterned surface on which a plurality of 622p are formed, and a second surface 622b, which is opposite to the first surface 622a. However, the light pipe 620 shown in FIG. 6 is different from the light pipe 320 shown in FIG. 5 in that the first surface 622a is an inner surface of the optical film 622. That is, the opposite side 622b of the prism patterns 622p may face the supporter 624, whereas the prisms 322p of the optical film 322 face the supporter 324. The apexes of the prisms 622p may face the cavity 680.

The maximum surface roughness (PV) of the side surfaces 622s of each of the prisms 622p may be within the range of 600 nm to 1.5 □. In addition, the RMS surface roughness of the side surfaces 622s of each of the prisms 622p may be within the range of 33 nm to 200 nm.

Then, the light pipe 620 may be able to effectively transmit light from one end to the other end of thereof, and the optical transmittance of the light pipe 620 may increase.

The previous discussion relates to RMS roughness. However, the invention is not limited to just RMS roughness. Other roughness measures may be used such as average (i.e., arithmetic mean) roughness or an unweighted or weighted mean.

Figure 7:
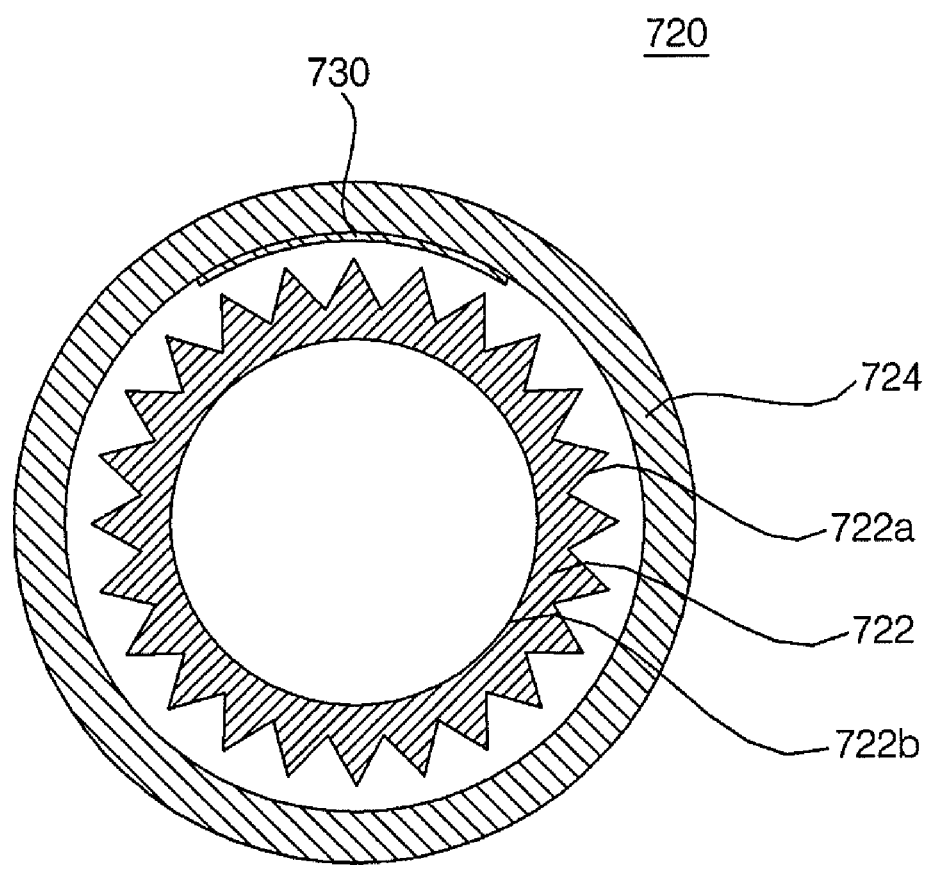
FIG. 7 illustrates a cross-sectional view of another variation of the light pipe shown in FIG. 3, taken along line B-B' of FIG. 3.

FIG. 7 illustrates a cross-sectional view of another variation of the light pipe 320 shown in FIG. 3, i.e., a light pipe 720, taken along line B-B' of FIG. 3. Referring to FIG. 7, the light pipe 720, like the light pipe 320 shown in FIG. 5, includes a supporter 724 and an optical film 722 having a first surface 722a, which is a patterned surface on which a plurality of prisms are formed, and a second surface 722b, which is opposite to the first surface 722a. However, the light pipe 720 shown in FIG. 7, unlike the light pipe 320 shown in FIG. 5, may also include a reflector 730. Thus, the light pipe 720 may be able to uniformly emit light along a predetermined direction.

Figure 8:
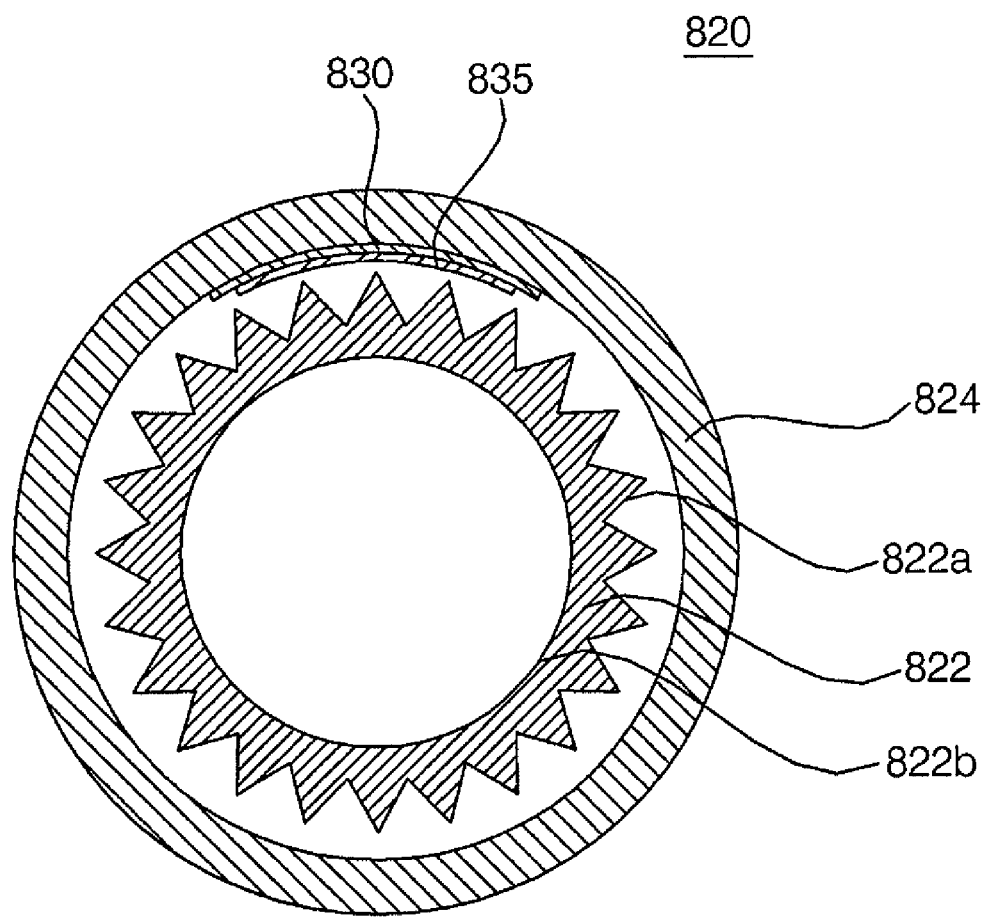
FIG. 8 illustrates a cross-sectional view of another variation of the light pipe shown in FIG. 3, taken along line B-B' of FIG. 3.

FIG. 8 illustrates a cross-sectional view of another variation of the light pipe 320 shown in FIG. 3, i.e., a light pipe 820, taken along line B-B' of FIG. 3. Referring to FIG. 8, the light pipe 820, like the light pipe 720 shown in FIG. 7, includes a supporter 824, an optical film 822 having a first surface 822a, which is a patterned surface on which a plurality of prisms are formed, and a second surface 822b, which is opposite to the first surface 822a, and a reflector 830. However, the light pipe 820 shown in FIG. 8, unlike the light pipe 720 shown in FIG. 7, may also include an extractor 835, which is disposed below the reflector 830. Due to the extractor 835, the light pipe 820 may be able to effectively emit light toward the outside of the light pipe 820.

Figure 9:
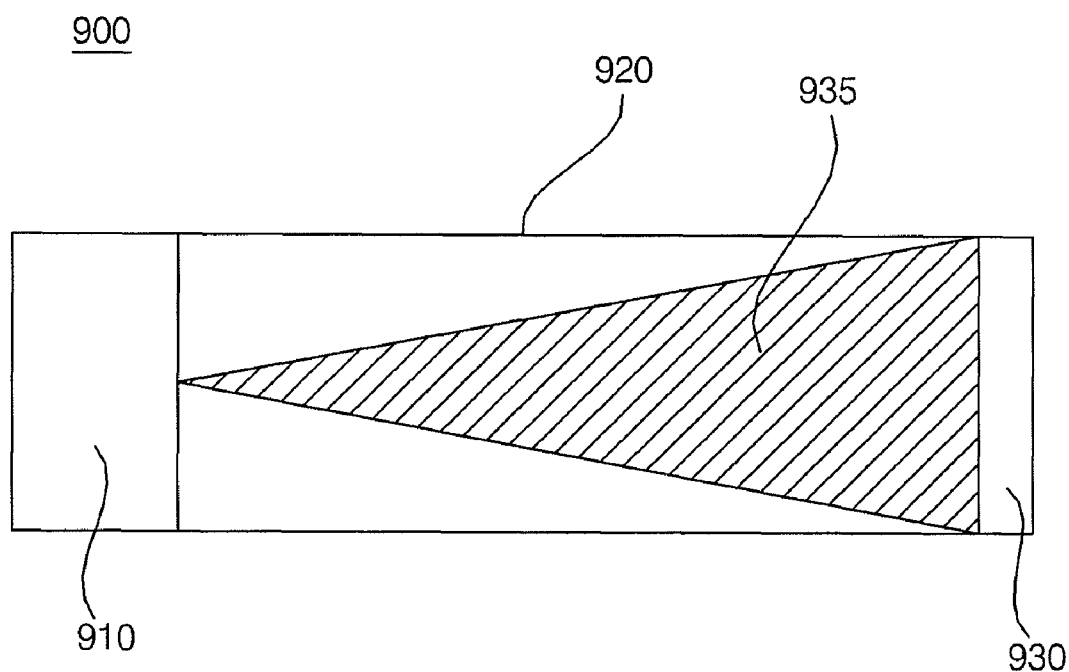
FIG. 9 illustrates a plan view of an illuminating device having the light pipe shown in FIG. 8.

FIG. 9 illustrates a plan view of an illuminating device 900 having a light pipe 920, which is the same as the light pipe 820 shown in FIG. 8. Referring to FIG. 9, the illuminating device 900 may include a light source unit 910, the light pipe 320, and a reflective cap 930. The light pipe 920 may include an extractor 935. The width of the extractor 935 may become larger more distant from the light source unit 910. The light source unit 910 is illustrated in FIG. 9 as being disposed on one side of the light pipe 920. However, two light source units 910 may be provided on either side of the light pipe 920. In this case, the extractor 935 may be formed as a rhombus whose width becomes larger distant from either one of the light source units 910.

Figure 10:
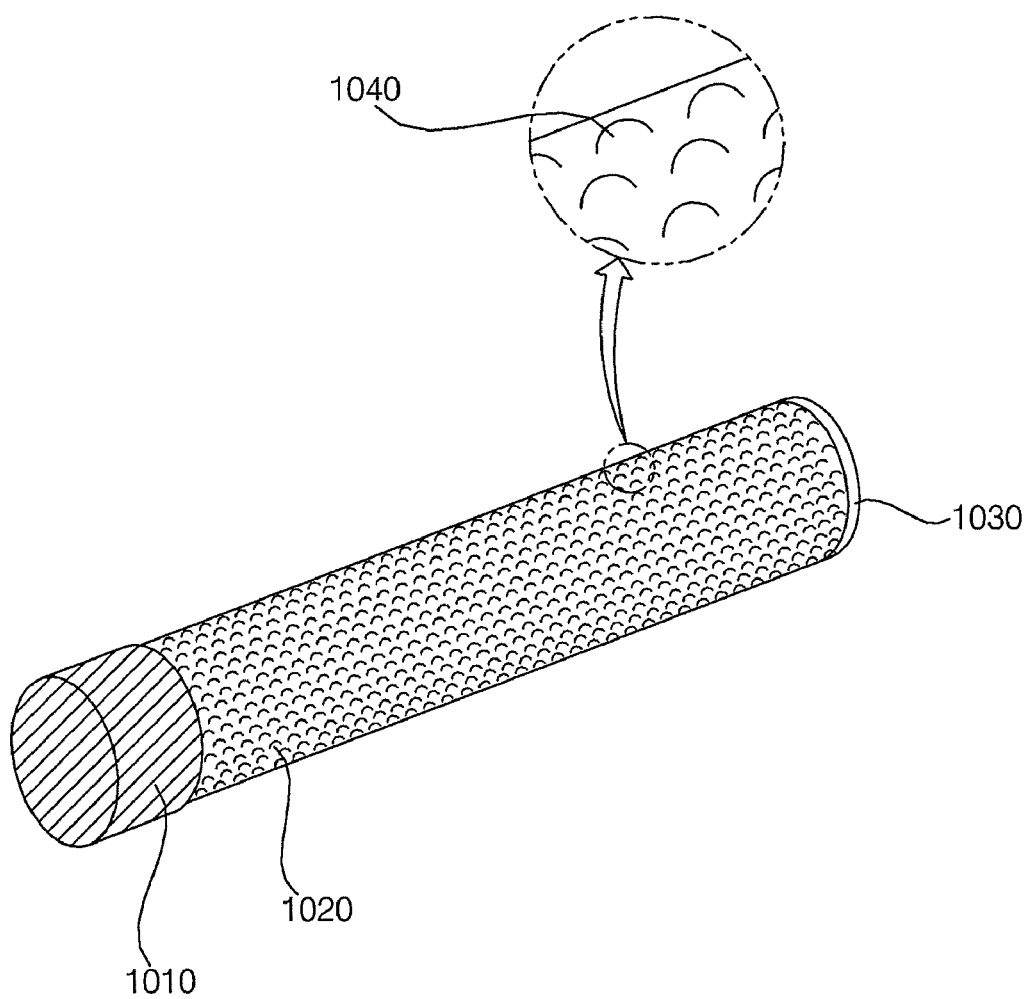
FIG. 10 illustrates a perspective view of an illuminating device according to another exemplary embodiment of the present invention.

FIG. 10 illustrates a perspective view of an illuminating device according to another exemplary embodiment of the present invention. Referring to FIG. 10, the illuminating device, like the illuminating device 300 shown in FIG. 3, includes a light source unit 1010, a light pipe 1020 and a reflective cap 1030. However, the illuminating device shown in FIG. 10 is different from the illuminating device 300 shown in FIG. 3 in that a plurality of protrusions 1040 are formed on the surface of a supporter of the light pipe 1020. The plurality of protrusions 1040 may be formed as one integral body with the supporter of the light pipe 1020. Meanwhile, a plurality of indentations may also be formed on the surface of a supporter of the light pipe 1020 and the plurality of indentations may be formed as one integral body with the supporter of the light pipe 1020

Due to the protrusions 1040 on the light pipe 1020, it is possible to uniformly emit light across the whole light pipe 1020.

Figure 11:
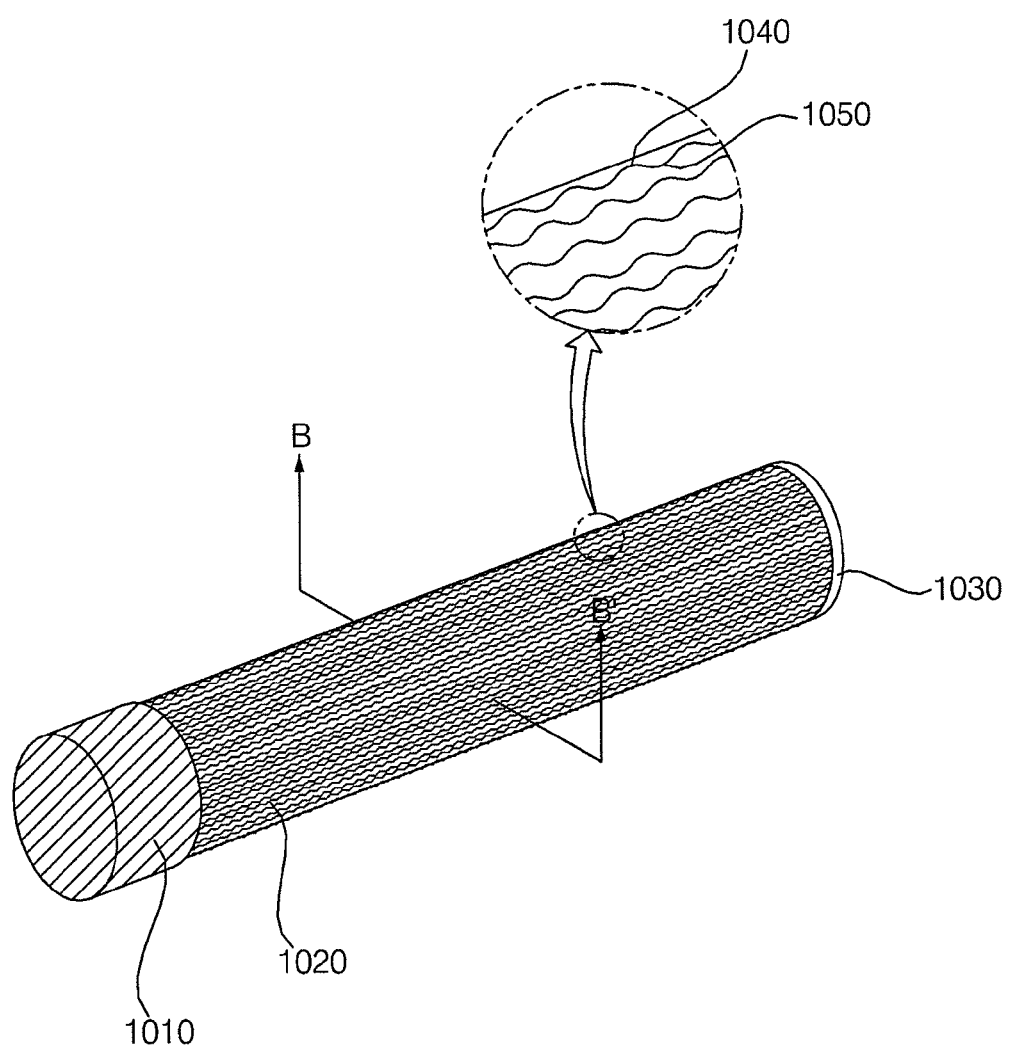
FIG. 11 illustrates a perspective view of an illuminating device according to another exemplary embodiment of the present invention.

FIG. 11 illustrates a perspective view of an illuminating device according to another exemplary embodiment of the present invention. Referring to FIG. 11, the illuminating device, like the illuminating device 300 shown in FIG. 3, includes a light source unit 1010, a light pipe 1020 and a reflective cap 1030. However, the illuminating device shown in FIG. 11 is different from the illuminating device 300 shown in FIG. 3 in that a plurality of protrusions 1040 and a plurality of indentations 1050 are formed on the surface of a supporter of the light pipe 1020. The plurality of protrusions 1040 and a plurality of indentations 1050 may be formed as one integral body with the supporter of the light pipe 1020

Due to the protrusions 1040 and the indentations 1050 on the light pipe 1020, it is possible to uniformly emit light across the whole light pipe 1020.

Figure 12:
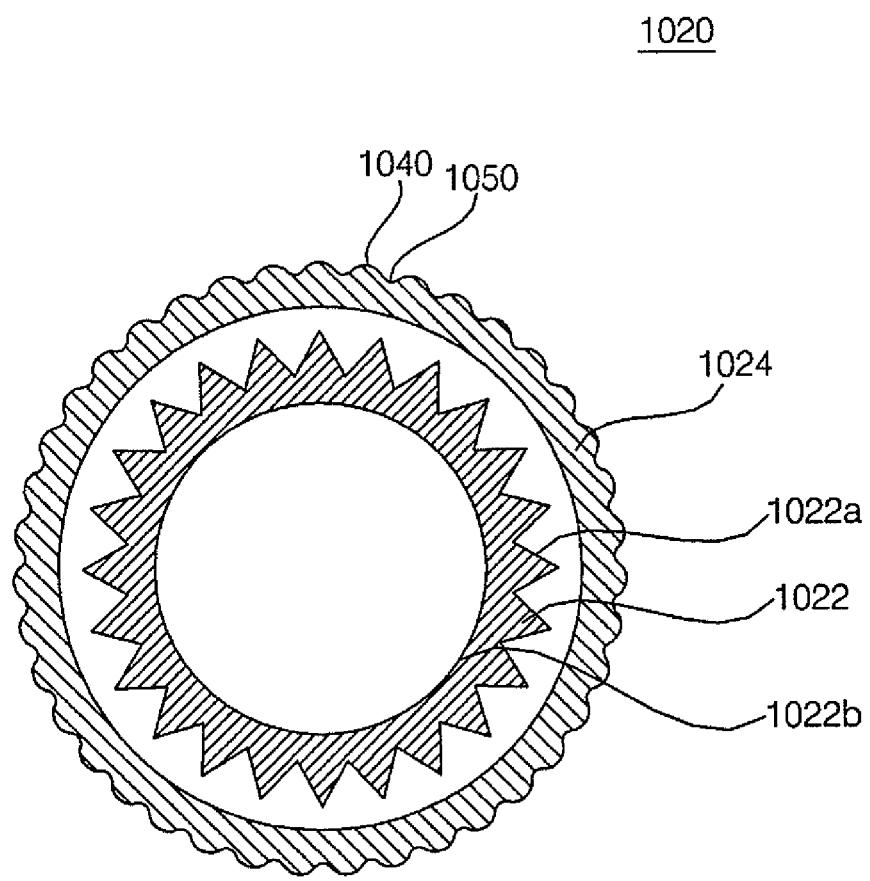
FIG. 12 illustrates a cross-sectional view of a light pipe shown in FIG. 11, taken along line B-B' of FIG. 11.

FIG. 12 illustrates a cross-sectional view of the light pipe 1020 shown in FIG. 11, taken along line B-B' of FIG. 11. Referring to FIG. 12, the light pipe 1020, like the light pipe 320 shown in FIG. 5, includes a supporter 1024 and an optical film 1022 having a first surface 1022a, which is a patterned surface on which a plurality of prisms are formed, and a second surface 1022b, which is opposite to the first surface 1022a.

However, the light pipe 1020 shown in FIG. 12 is different from the light pipe 320 shown in FIG. 5 in that a plurality of protrusions 1040, a plurality of indentations 1050 or both are formed on at least one of inner and outer surfaces of the supporter 1024. The protrusions 1040 and the indentations 1050 may be formed by performing surface treatment on the supporter 1024 through injection, extrusion, roll processing, thermal curing, or UV curing.

For example, the protrusions 1040 and/or the indentations 1050 may be formed on the supporter 1020 by pressing a roll or a plate engraved with a plurality of protrusions and/or a plurality of indentations down on a surface of the supporter 1024.

Alternatively, the protrusions 1040 and/or the indentations 1050 may be formed on the supporter 1020 by injecting resin into a panel-type mold engraved with a plurality of protrusions and/or a plurality of indentations and curing the resin. The formation of the protrusions 1040 and/or the indentations 1050 may be performed in various manners, other than those set forth herein.

Since the protrusions 1040 and the indentations 1050 scatter or totally reflect light, it is possible to uniformly emit light from the light pipe 1020 regardless of the location of a light source unit.

Figure 13:
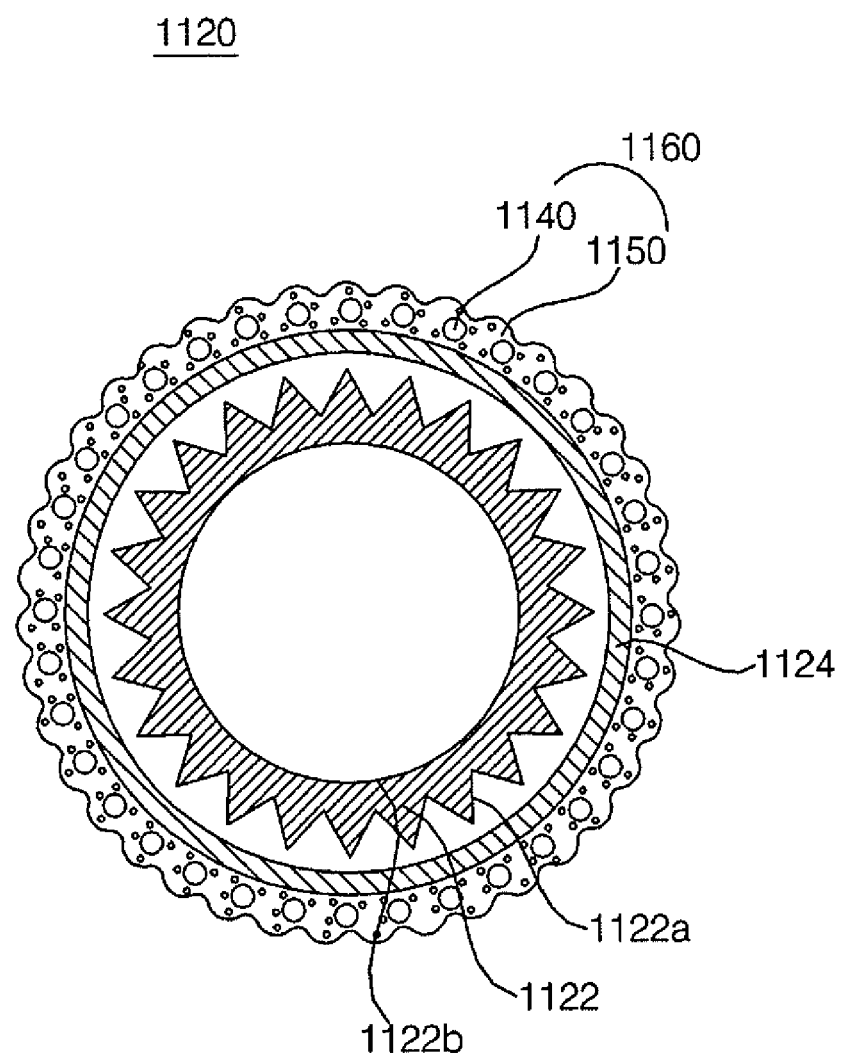
FIG. 13 illustrates a cross-sectional view of a variation of the light pipe shown in FIG. 11, taken along line B-B' of FIG. 11.

FIG. 13 illustrates a cross-sectional view of a variation of the light pipe 1020 shown in FIG. 11, i.e., a light pip 1120, taken along line B-B' of FIG. 11. Referring to FIG. 13, the light pipe 1120, like the light pipe 320 shown in FIG. 5, includes a supporter 1124 and an optical film 1122 having a first surface 1122a, which is a patterned surface on which a plurality of prisms are formed, and a second surface 1122b, which is opposite to the first surface 1122a.

The light pipe 1120 shown in FIG. 13, unlike the light pipe 320 shown in FIG. 5, may also include a diffusion layer 1160 including a light-transmitting material 1150 and a plurality of diffusion particles 1140. The diffusion layer 1160 may be formed on at least one of inner and outer surfaces of the supporter 1124. The light-emitting material 1150 may be resin. The diffusion layer 1160 may be formed by coating the supporter 1124 with a mixture of resin and the diffusion particles 1140 and performing curing. The diffusion layer 1160 is illustrated in FIG. 13 as being disposed on the outer surface of the supporter 1124.

The diffusion particles 1140 may include a silica-based material. More specifically, the diffusion particles 1140 may be beads containing at least one of silica, PMMA and polystyrene.

The resin 1150 may include at least one of polyethylene, polypropylene, polycarbonate, polyester and acryl, which are transparent materials with well-balanced mechanical, heat-resistant, cold-resistant, and electrical properties.

Due to the diffusion layer 1160, it is possible to uniformly emit light from the light pipe 1020 regardless of the location of a light source unit.

The light pipe 1120 may also include a diffusion sheet disposed between the optical film 1122 and the supporter 1124 and including a plurality of diffusion particles and a light-transmitting material. The light-transmitting material of the diffusion sheet may be resin. The diffusion sheet may be formed by coating at least one surface of a base film with a mixture of resin and a plurality of diffusion particles and performing curing on the base film.

According to the present invention, a light pipe includes an optical film having a plurality of prisms whose surface roughness falls within a predetermined range. Thus, according to the present invention, it is possible to uniformly emit light across a whole light pipe and improve the optical transmittance of a light pipe.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A light pipe, comprising:
   an optical film including a plurality of prisms, the optical film rolled to form a cavity extending along a longitudinal direction of the plurality of prisms; and
   a supporter surrounding the rolled optical film having the cavity,
   wherein a side surface of one of the plurality of prisms has a predetermined surface roughness, and
   wherein the supporter includes a plurality of protrusions and/or indentations on a surface of the supporter which are formed as one integral body with the supporter.

2. The light pipe of claim 1, wherein the predetermined surface roughness is a maximum surface roughness, and
   wherein the maximum surface roughness is about 600 nm to about 1.5 µm.

3. The light pipe of claim 1, wherein the predetermined surface roughness is a root mean square (RMS) surface roughness, and
   wherein the RMS surface roughness is about 33 nm to about 200 nm.

4. The light pipe of claim 1, wherein the side surface includes an approximate sinusoid shape having a wavelength (λ), and
   wherein a length (L) of the side surface is about 0.5λ to about 2.0λ.

5. The light pipe of claim 1, wherein apexes of the plurality of prisms face the supporter.

6. The light pipe of claim 1, wherein apexes of the plurality of prisms face the cavity.

7. The light pipe of claim 1, wherein the supporter includes a plurality of protrusions and indentations on a surface of the supporter, and
   wherein the protrusions and the indentations are formed as one integral body with the supporter.

8. The light pipe of claim 1, further comprising:
   a diffusion layer including a light-transmitting material and a plurality of diffusion particles and disposed on at least one of an inner surface and an outer surface of the supporter.

9. The light pipe of claim 1, further comprising:
   at least one of a reflector and an extractor formed on the supporter.

10. An illuminating device, comprising:
    a light source configured to emit a light; and
    a light pipe configured to transmit and distribute the light emitted from the light source,
    wherein the light pipe comprises,
    an optical film including a plurality of prisms, the optical film rolled to have a cavity extending along a longitudinal direction of the plurality of prisms; and
    a supporter surrounding the optical film having the cavity,
    wherein a side surface of one of the plurality of prisms has a predetermined surface roughness, and wherein the supporter includes a plurality of protrusions and/or indentations on a surface of the supporter which are formed as one integral body with the supporter.

11. The illuminating device of claim 10, wherein the predetermined surface roughness is a maximum roughness, and
wherein the maximum surface roughness is about 600 nm to about 1.5 µm.

12. The illuminating device of claim 10, wherein the predetermined surface roughness is a root mean square (RMS) surface roughness, and
wherein the RMS surface roughness is about 33 nm to about 200 nm.

13. The illuminating device of claim 10, wherein the side surface includes an approximate sinusoid shape having a wavelength ($\lambda$), and
wherein a length (L) of the side surface is approximately $0.5\lambda$ to $2.0\lambda$.

14. The illuminating device of claim 10, wherein apexes of the plurality of prisms face the supporter.

15. The illuminating device of claim 10, wherein apexes of the plurality of prisms face the cavity.

16. The illuminating device of claim 10, wherein the supporter includes a plurality of protrusions and indentations on a surface of the supporter, and
wherein the protrusions and the indentations are formed as one integral body with the supporter.

17. The illuminating device of claim 10, further comprising:
a diffusion layer including a light-transmitting material and a plurality of diffusion particles and disposed on at least one of an inner surface and an outer surface of the supporter.

18. The illuminating device of claim 10, further comprising:
at least one of a reflector and an extractor formed on the supporter.

* * * * *